April 28, 1925.
C. F. WADSWORTH
1,535,510
OIL BURNER
Filed April 18, 1923     2 Sheets-Sheet 1
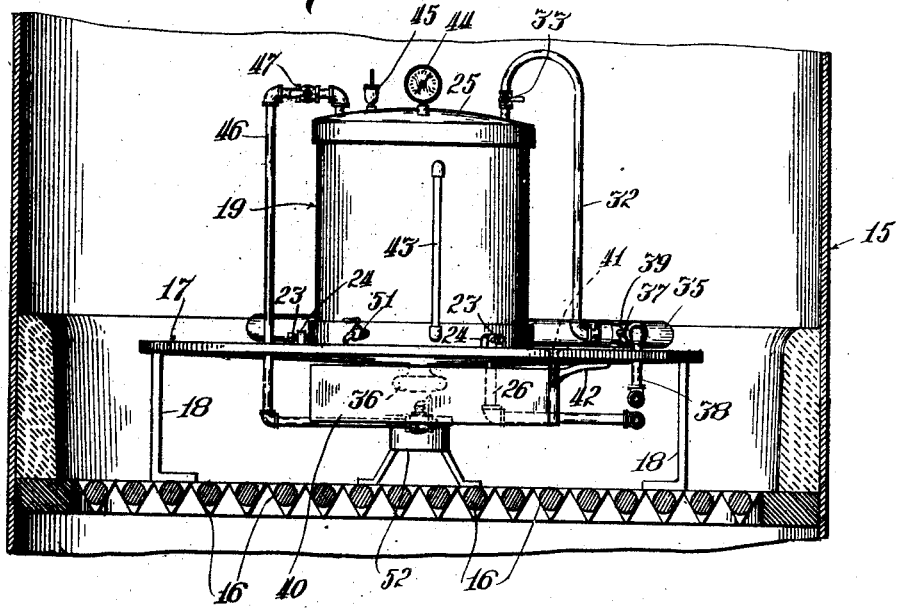

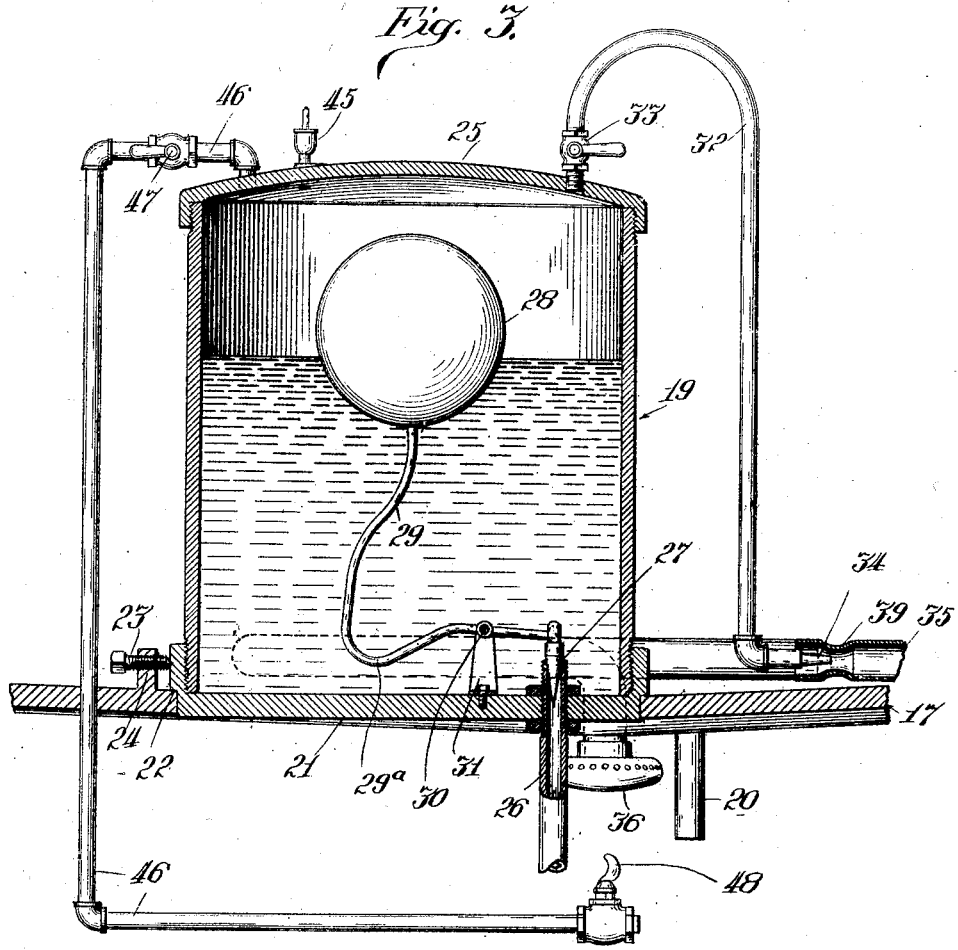

Patented Apr. 28, 1925.

1,535,510

UNITED STATES PATENT OFFICE.

CHARLES F. WADSWORTH, OF CHICAGO, ILLINOIS.

OIL BURNER.

Application filed April 18, 1923. Serial No. 632,307.

*To all whom it may concern:*

Be it known that I, CHARLES F. WADSWORTH, a citizen of the United States, and a resident of Chicago, in the county of Cook and State of Illinois, have invented certain new and useful Improvements in Oil Burners, of which the following is a description, reference being had to the accompanying drawings, which form a part of my specification.

My invention relates to a burner adapted to the use of furnace oil or kerosene as a fuel; the burner being more especially intended for heating purposes; the invention having for its object the provision of a construction whereby steam and air will be commingled with the oil and the mixture preheated in its flow to the burner proper and carbonization thereby practically eliminated.

A further object of the invention is to provide a portable burner unit provided with a generating portion whereby a constant steam supply is provided while the burner is in operation; the generated steam being conveyed to a mixing chamber or conduit and so discharged therein as to entrain the oil and air therewith, cause the oil to be sprayed or finely divided in the conduit and a thorough admixture of said elements induced during flow to the burner proper; the mixing chamber or conduit being arranged to be preheated by the flame of the burner proper.

A further object of my invention is to provide means for automatically controlling the water supply in the steam generating portion of the burner in order to maintain and permit of the constant generation of steam while the burner is in operation and at the same time to discontinue the inflow of water into the generator portion when operation of the burner is discontinued; that is to say, the water admitted is in keeping with the steam generated and used.

The above enumerated objects with the advantages inherent in the construction will all be more readily comprehended from the detailed description of the accompanying drawings, wherein:—

Figure 1 is a partial sectional view of the fire-pot of a furnace with my improved burner or oil burning unit shown in elevation on the grate-bars of the furnace.

Figure 2 is a top plan view of my improved burner removed from the furnace.

Figure 3 is a sectional view taken on the line 3—3 of Figure 2 looking in the direction of the arrows.

Figure 4 is a detail sectional view of the inlet end of the mixing conduit.

Figure 5 is a detail sectional view of the burner proper and supporting plate with overflow conduit.

My improved burner, as previously stated, is especially intended for installation in any suitable heating furnace, a portion of the walls whereof are shown at 15. The burner is intended to be placed on the grate-bars shown at 16, thus adapting the burner to furnaces of heating systems at present in use. The burner unit comprises a suitable plate 17, preferably circular as shown, and of diameter somewhat less than the inside diameter of the fire-pot of the furnace so as to leave a circumferential space about the perimeter of the plate for the passage of the hot gases and permit same to contact with the side walls and water chamber of the furnace in order that the water may be properly heated or steam generated, depending upon the nature of the heating system in which my burner unit is installed.

The plate 17 is intended to be suitably supported on the grate-bars, in spaced relation therewith, in any suitable manner as for example by the brackets or standards 18; the plate, preferably to one side of its center, being formed to receive a steam generator indicated at 19. The plate 17 is preferably slightly dished to cause any unconsumed or improperly discharged oil to flow toward an overflow conduit 20 which may extend to the furnace exterior and discharge into any suitable receptacle.

The plate 17 is preferably provided with a suitable opening to receive the bottom 21 of the steam generator 19; the bottom 21 being formed to extend flush with the bottom of the plate 17 as shown in Figure 3; being shouldered as at 22 in order to maintain its position and preferably secured in place against accidental removal by a suitable number of set-screws or bolts 23 threaded through lugs 24 formed integral with plate 17 and engaging the upstanding flange portion of the bottom 21 of the vessel 19. The vessel or generator 19 is preferably made with the side walls screwed into the flange portion of the bottom 21 as shown in Figure 3 and the side walls are also provided with a dome or top 25 which may likewise be threaded onto the exterior of the side walls.

The bottom 21 may be of any suitable material which will enable the contents of the generator 19 to become quickly heated and steam generated. The bottom 21 is provided with an inlet conduit 26 which may connect with the main water line or pipe of the building so as to permit constant flow of water into the bottom of the generator 19 when the valve 27 is open.

I show the generator 19 provided with a float member 28 secured to the end of a rod 29 which is preferably given the angular formation shown so as to have the portion 29ᵃ thereof normally extend beneath the pivot point 30 where the arm or rod 29 is secured to a bracket 31 secured on the bottom 21 of the vessel. The end of the arm or rod 29 has pivotal connection with the tapered member or needle-valve 27 which controls the inflow of water. The valve 27 is tapered and preferably of such length that it will at all times be properly positioned in the end of the conduit 26 even when the float 28 has dropped down into its extreme lowered position, namely with the bend 29ᵃ of the rod 29 in contact with the bottom 21 of the vessel. That is to say, the distance between the bend 29ᵃ of the rod and the bottom of the vessel is preferably slightly less than the length of valve 27 in order that the latter may at no time be entirely withdrawn from the end of the conduit 26 and therefore constantly ensures a proper seating of valve 27 when float 28 is again elevated through the inflow of sufficient water. The relation between the float member 28 and the valve 27 is such that the inflow of water will be completely shut off after a predetermined supply of water has entered the chamber 19 so as to at all times provide a steam space in the upper part of the vessel 19.

The top of the vessel is shown provided with a conduit 32, having a suitable valve as at 33; while the end of the conduit 32 is arranged at a point in proximity to the plate 17 and terminates in a horizontally disposed nozzle 34. The nozzle 34 extends slightly into the end of a conduit 35 which is preferably disposed on the plate 17 in a more or less circuitous manner as shown in Figure 2, with its end extended through an opening, preferably at the center of the plate 17, where it is provided with a suitable burner 36 secured immediately beneath plate 17; the burner 36 being preferably of cup formation shown with a suitable number of perforations in the side walls thereof, as shown in Figures 3 and 5.

The inlet end of conduit 35, is also provided with a nozzle 37 disposed preferably substantially at right angles to nozzle 34; the nozzle 37 being suitably connected to conduit 38 which leads from a suitable oil supply, not shown, and arranged to permit the oil to flow by gravity to nozzle 37.

The oil pipe 38 is, of course, provided with a suitable valve in order to control the quantity of oil issuing from nozzle 37. The oil issuing from the nozzle 37, through the action of the small jet of steam issuing from nozzle 34 and passing across the tip of nozzle 37, will be broken up into a fine spray and entrained with the steam in its passage through conduit 35. The inlet end of conduit 35 is preferably open so that air may also enter the conduit to be commingled with the admixture of steam and oil; the entrainment of the air and thorough commingling of oil, steam and air being induced by the restricted or Venturi portion 39 shown in Figures 3 and 4 and arranged at the tips of the nozzles 34 and 37. With this construction, it is apparent that a thorough commingling of the oil, steam and air is induced; the oil being atomized or sprayed into the conduit and the admixture of oil, steam and air caused to flow through conduit 35 which is arranged on top of the heated plate 17, with the result that said mixture will be preheated in its passage to the burner 36 and a rich combustible mixture provided, which, however, will not carbonize.

As is apparent from the construction shown, a portion of the flame of the burner will normally pass beneath the bottom 21 of the generator 19 and therefore cause a generation of steam as long as the burner is in operation. In order to control the rapidity of steam generation, I prefer to provide a baffle member 40, in the nature of a vertically disposed plate of proper width pivotally secured at the point 41 to the under side of the plate 17 so as to permit the baffle member or plate to swing laterally toward and away from burner 36; the baffle plate 40 being provided with an extension 42 adapted to bear against the bottom of the plate 17 so as to somewhat relieve the pivot point 41 of the weight of the baffle member and permit it to be easily manipulated; the end 42 being preferably arranged at a slight angle to the main portion, as shown in Figure 2, in order that the baffle member or plate 40 may be swung into either of its extreme positions and still permit the extension 42 to be so disposed where it may be readily accessible through the clinker door or opening of the furnace. As is apparent from the construction shown in Figure 2, the extent to which the flame from the burner may play beneath the bottom 21 of the generator can be readily controlled by the positioning of the baffle plate 40. In Figure 2, the baffle plate is shown positioned to permit approximately three-fourths of the generator bottom to be exposed to the flame. On the other hand, the baffle member may be swung toward the burner 36 so that none of the generator bottom will be subjected to the flame; such positioning occurring when it is found that more steam is being generated than is required, namely during mild weather conditions when a lesser amount of heat is required.

The generator 19 is shown provided with a suitable water glass 43 in order that the water level in the generator may be observed and the top of the generator is also preferably provided with a pressure gauge at 44 and with a blow-off cock or valve 45 in the event of steam generation in excess of the required pressure.

The steam space of the generator 19 is also provided with an outlet line 46 provided with a suitable valve 47; the line 46 leading downwardly to a point preferably immediately beneath burner 36 where the steam line is provided with a suitable swirling spray nozzle 48 whereby a circular spray of steam is caused to be discharged beneath burner 36 with more or less force in a radial direction, increasing the flow of the gaseous mixture and causing more oxygen to mingle with the products and therefore enhancing combustion, when a greater amount of heat is desired, namely during extreme low temperature conditions.

The oil supply line 38, as previously stated, leads from a suitable elevated oil supply and is provided with a suitable valve as at 49 which may be provided with a lever to be operated by the thermostat or temperature control mechanism usually located on hot water or steam furnaces; the valve 49 being connected with the thermo-control lever or element by a link connection, a portion whereof is shown at 50 in Figure 2, so that the flow of oil through nozzle 37 may be controlled or regulated by the temperature-control mechanism of the furnace and the amount of gaseous mixture for the burner 36 automatically decreased or increased as the temperature conditions of the furnace reach predetermined degrees.

To take care of the possibility of oil discharge when the burner is not in operation, I prefer to slightly dish the heating plate 17 and provide it with the overflow outlet and conduit 20 as previously stated, which conduit may lead to the furnace exterior and discharge into any suitable receptacle.

The generator 19, adjacent the bottom, may be provided with a suitable drain or draw-off cock as at 51 in Figure 1 to permit a cleaning of the steam generator when desired.

In the operation of my improved burner, the steam generator 19 is initially heated in any suitable manner as for example by the employment of a small alcohol lamp or burner as at 52, which may be removably mounted beneath the generator or pivotally secured in place so as to be swung out of the path of the baffle member 40 when not in use.

The generator 19 is of dimensions adapted to merely hold a comparatively small quantity of water and is of such construction as to permit comparatively quick flashing or generation of steam. During the initial heating of the generator, it will be understood that the valve 49 of supply line 38 and valve 33 of steam line 32, as well as the valve 47 of steam line 46 are all shut off until a sufficient amount of steam has been generated in vessel 19, at which time valve 33 of steam line 32 is opened to the desired extent so that steam may issue from nozzle 34 into conduit 35. Valve 49 of the oil supply line 38 is then opened, allowing oil to issue through nozzle 37. The oil is sprayed into conduit 35 by the action of the jet of steam and the action of the venturi arranged in conduit 35, whereby air is also made to flow into and forcibly pass about the nozzles, thereby inducing a thorough mixing of the sprayed oil, steam and air. The mixture issuing from burner 36 may then be ignited, which causes the plate 17 to be heated and therefore also preheats the gaseous mixture flowing through the mixing chamber or conduit 35. It is evident that as the water in generator 19 is generated into steam, thereby depleting the water supply, float member 28 will recede and correspondingly open valve 27 to allow inflow of water in keeping with the amount of vaporization or steam withdrawal and as a result a continuous automatically operating burner is provided, adapted to operate as long as the oil supply is maintained. On the other hand, the flow of water into generator 19 will be automatically closed off as soon as a predetermined quantity of water has entered the generator; while the pressure in the generator may be controlled by the blow-off cock 45 which may be adjusted to operate at a predetermined pressure. During the initial operation of the burner, baffle member 40 is swung toward the front, namely in counterclockwise direction in Figure 2, so as to expose the entire bottom of generator 19 to the flame issuing from burner 36. In the event that generation of steam is in excess of requirements, the baffle member 40 may then be swung backward, in clockwise direction in Figure 2, so that only a predetermined portion of the generator bottom is exposed to the action of the flame.

During exceedingly low temperature conditions, it may be found desirable to enhance combustion, at which time valve 47 of steam line 46 may be opened to the desired extent so that steam will issue through swirling spray nozzle 48 and be caused to mingle with the products.

With my improved construction, tendency of carbonization is eliminated and an element of safety provided by reason of the fact that the water is automatically shut off in the event of the flame becoming extinguished, at which time no generation of steam can take place; while at the same time any oil that may issue from nozzle 37 would flow out through the inlet end of mixing conduit 35 and flow through conduit 20 into a suitable receptacle.

I have shown what I believe to be a simple adaptation of my invention which has been described in terms employed merely as terms of description and not as terms of limitation, as structural modifications are possible and may be made without, however, departing from the spirit of my invention.

What I claim is:—

1. A device of the character described, comprising a base plate, a steam generating chamber mounted on said plate, means for automatically controlling the admission of water to said chamber, a mixing conduit arranged on said plate with one end thereof extending beneath said plate, a burner secured to said end of the mixing conduit so as to have the products of combustion heat said plate when the burner is in operation, a conduit leading from the steam space of said steam generating chamber to the other or inlet end of the mixing conduit, whereby steam is discharged into the other end of said mixing conduit, and an oil supply conduit connected with said mixing conduit in advance of and at an angle to said steam conduit so as to have the steam discharge across the discharge end of the oil conduit and cause the oil to be sprayed into the mixing conduit, the last mentioned end of said mixing conduit being formed to permit air to be entrained with the steam and oil spray.

2. In a device of the character described, a base plate, a burner secured therebeneath so as to heat the plate when the burner is in operation, a water-holding chamber mounted on said plate to be heated by said burner, a mixing conduit arranged on said plate so as to be heated thereby, said conduit being connected with the burner and arranged to have air admitted thereto, an oil supply pipe provided with a nozzle communicating with the mixing conduit, a conduit connected with the steam space of said water chamber and terminating in a nozzle at the inner end of said mixing conduit whereby steam is injected into said mixing conduit so as to spray the oil into said conduit, and means adjustably secured beneath said plate to swing transversely beneath the water holding chamber as a baffle to the products of combustion whereby heating of said water holding chamber may be regulated.

3. In a device of the character described, a base plate adapted to be supported on the grate-bars of a heating furnace, a steam generating chamber mounted on said plate, a burner mounted beneath said plate so as to heat said plate and said chamber, a mixing conduit arranged on said plate to be heated thereby and connected with said burner, a conduit leading from the steam space of said steam generating chamber and having a discharge nozzle communicating with said mixing conduit, and an oil supply pipe provided with a nozzle communicating with the mixing conduit forward of the steam nozzle, so located relative to the flow through said mixing conduit, as to have the oil sprayed into said mixing conduit by the discharging steam, the mixing conduit adjacent to said nozzle being formed to permit air to be entrained with the steam and oil spray and commingle therewith.

4. In a device of the character described, a base plate, a burner mounted therebeneath so as to heat said plate when the burner is in operation, a steam generating chamber mounted on the plate in proximity to said burner so as to be heated thereby, a horizontally disposed mixing conduit arranged on said base plate and connected with said burner, a steam conduit leading from the generating chamber, adapted to inject steam into the inlet end of said mixing conduit and to entrain air therewith, and an oil supply pipe connected with said mixing conduit at a point adjacent to and in advance of the steam conduit so that the injected steam will cause the oil issuing from the pipe to be sprayed into the mixing chamber and to flow toward the burner.

5. In a device of the character described, a base plate provided with an opening, a steam generating chamber mounted in said opening, a burner secured beneath the plate in proximity to the bottom of said chamber, a mixing conduit arranged on said plate with one end connecting with said burner while the other end is provided with a venturi and adapted to permit inflow of air, a steam pipe leading from the steam space of said steam generating chamber and terminating in a nozzle arranged in the venturi end of said conduit, an oil supply line provided with a nozzle arranged at an angle to and in juxtaposition with the steam nozzle whereby the oil is divided into a spray by the discharging steam, and means for controlling the flow of oil.

6. In a device of the character described, a base-plate, a steam generating chamber arranged thereon, means whereby the flow of water into said chamber is automatically controlled, a burner disposed beneath said base-plate, an air receiving conduit disposed lengthwise on said base-plate and communicating with said burner, a steam pipe leading from the steam space of said chamber and terminating in a nozzle arranged concentric with the air admitting end of said conduit, an oil supply pipe terminating in a nozzle extending into said conduit at an angle to the steam-pipe nozzle and in advance thereof so the steam will discharge across the oil-pipe nozzle and force the oil into said conduit in the form of a spray, and a baffle-plate pivotally secured beneath the base-plate so as to swing toward and away from the burner and thereby control the degree of heating of said water-holding chamber.

7. A device of the character described, comprising a base-plate adapted to be supported on and in spaced relation with the grate-bars of a furnace, a steam generating chamber on said base-plate, a mixing chamber mounted on said base-plate to be heated thereby, a steam supply pipe and oil supply pipe connected with the mixing chamber so as to have the steam discharge across the end of the oil supply pipe and cause the oil to be sprayed by and mixed with the steam, a burner disposed beneath the base-plate, and means whereby steam may be discharged adjacent to said burner.

8. A device of the character described, comprising a base-plate adapted to be supported on and in spaced relation with the grate-bars of a furnace, a steam generating chamber on said base-plate, a mixing conduit on said base-plate to be heated thereby, a steam supply pipe and an oil supply pipe discharging into the mixing conduit, the oil supply pipe discharging at an angle to and in advance of the steam pipe so as to cause the oil to be broken into a spray and made to commingle with the steam, the mixing conduit adjacent to the discharge ends of the steam and oil pipes being formed to permit inflow of air, a burner connected with said mixing conduit and disposed beneath the base-plate, and means pivotally secured beneath the base-plate for controlling the spread of the flame beneath the base-plate.

9. In a device of the character described, a base-plate, a steam generating chamber mounted in said base-plate, a water-supply line leading to said chamber, means whereby the inflow of water into said chamber is automatically determined, a steam, oil and air mixing conduit mounted on said base-plate so as to be heated thereby, a burner disposed beneath the plate and connected with said mixing conduit, means whereby steam from the generating chamber is conveyed to the mixing conduit, means whereby pressure in said generating chamber is maintained below a predetermined degree, and means for conveying oil to said mixing conduit.

10. In a device of the character described, a base-plate provided with an opening and an overflow pipe, a steam generating chamber mounted in said opening, a float controlled valved supply pipe connected with said steam generating chamber, a circuitous open ended conduit disposed on said base-plate with one end extending therethrough, a burner secured to said last mentioned end beneath the base-plate, the open end being provided with a venturi or restricted throat, an oil supply pipe and a steam pipe leading from the steam chamber, both pipes communicating with the open end of said conduit, with the oil pipe discharge end arranged in advance of and at an angle to the discharge end of the steam pipe so as to have the discharging steam spray the oil into the conduit and induce inflow of air into the conduit, a second steam pipe leading from the steam chamber and terminating in a swirling spray beneath said burner, and means whereby the oil supply through said pipe may be controlled.

11. In a device of the character described, the combination with a base-plate, a steam generator mounted on said plate with its bottom flush with the bottom of the base-plate, a mixing conduit mounted on the base-plate with one end disposed therethrough, a burner secured to the conduit and disposed beneath the base-plate adjacent to the bottom of the steam generator, a valved oil-supply pipe discharging into said conduit, a valved steam pipe leading from the generator and discharging into the conduit rearward of and across the discharge end of the oil supply pipe so as to break the oil into a film or spray, and means pivotally mounted beneath the base-plate for directing the burner-flame away from the generator bottom.

CHARLES F. WADSWORTH.

Witnesses:
G. HEIDMAN,
F. A. FLORELL.